United States Patent
Amao et al.

(10) Patent No.: US 8,690,306 B2
(45) Date of Patent: Apr. 8, 2014

(54) INK COMPOSITION AND IMAGE FORMING METHOD

(75) Inventors: Akihito Amao, Kanagawa (JP); Koji Yasuda, Kanagawa (JP); Hirotaka Kitagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 190 days.

(21) Appl. No.: 13/401,868

(22) Filed: Feb. 22, 2012

(65) Prior Publication Data

US 2012/0249700 A1  Oct. 4, 2012

(30) Foreign Application Priority Data

Mar. 31, 2011  (JP) .................. 2011-079372

(51) Int. Cl.
*B41J 2/01*  (2006.01)
(52) U.S. Cl.
USPC .............................. 347/100; 347/95; 523/160
(58) Field of Classification Search
USPC ........... 347/100, 95, 96, 102, 101, 88, 99, 20, 347/21, 9; 106/31.6, 31.13, 31.27; 523/160, 523/161
See application file for complete search history.

(56) References Cited

U.S. PATENT DOCUMENTS

| | | | | |
|---|---|---|---|---|
| 6,127,453 | A * | 10/2000 | Erdtmann et al. | 523/160 |
| 7,285,310 | B2 * | 10/2007 | Kanke et al. | 427/466 |
| 2005/0288384 | A1 | 12/2005 | Kanke et al. | |
| 2008/0076846 | A1 | 3/2008 | Kito et al. | |
| 2009/0286001 | A1 * | 11/2009 | Kanke et al. | 347/102 |
| 2010/0080913 | A1 | 4/2010 | Irita | |
| 2011/0205291 | A1 * | 8/2011 | Yasuda et al. | 347/21 |

FOREIGN PATENT DOCUMENTS

| | | |
|---|---|---|
| JP | S49012651 A | 3/1974 |
| JP | H09003426 A | 1/1997 |
| JP | 2005-307198 A | 11/2005 |
| JP | 2007-31372 A | 2/2007 |
| JP | 2007314610 A | 12/2007 |
| JP | 2008163342 A | 7/2008 |
| JP | 2010069805 A | 4/2010 |
| JP | 2010229252 A | 10/2010 |
| JP | 2010260958 A | 11/2010 |

* cited by examiner

*Primary Examiner* — Manish S Shah
(74) *Attorney, Agent, or Firm* — SOLARIS Intellectual Property Group, PLLC

(57) ABSTRACT

An ink composition including:
(Component A) a polymerizable compound represented by following Formula (1);
(Component B) a monofunctional polymerizable compound having a (meth)acrylamide structure;
(Component C) a photopolymerization initiator;
(Component D) a colorant; and
(Component E) water, Formula (1)

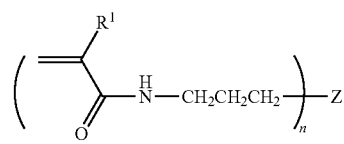

wherein in Formula (1), Z represents a polyol residue formed by removing n hydrogen atoms from hydroxyl groups of a trihydric to hexahydric polyol, $R^1$ represents a hydrogen atom or a methyl group, and n represents an integer of from 3 to 6.

14 Claims, No Drawings

INK COMPOSITION AND IMAGE FORMING METHOD

CROSS-REFERENCE TO RELATED APPLICATIONS

This application is based on and claims priority under 35 USC 119 from Japanese Patent Application No. 2011-079372 filed on Mar. 31, 2011, the disclosure of which is incorporated by reference herein.

BACKGROUND OF THE INVENTION

1. Technical Field

The present invention relates to an ink composition and an image forming method.

2. Description of the Related Art

In recent years, shift to aqueous printing inks has been demanded in order to reduce the emission of volatile organic compounds (VOC) from the viewpoint of improving work environment and preventing air pollution. Examples of conventional means for fixing an image formed using an aqueous ink include a method of fixing an image, which has been formed using an aqueous ink including a thermoplastic latex, by heating; and a method of fixing an image, which has been formed using an actinic energy ray-curable aqueous ink including a water-soluble monomer, a water-soluble polymer having a polymerizable group, or the like, by irradiating the image with actinic energy rays such as ultraviolet rays. Among these, an actinic energy ray-curable aqueous ink containing a water-soluble monomer is suitable for an inkjet method since such an ink has low viscosity.

Japanese Patent Application Laid-Open (JP-A) No. 2007-31372 discloses a polyfunctional acrylamide compound obtained by reacting a N-alkoxymethyl (meth)acrylamide having a specific structure with a polyhydric alcohol having two or more hydroxyl groups.

JP-A No. 2005-307198 discloses an actinic energy ray-curable aqueous ink composition containing a polyfunctional (meth)acrylamide compound having a specific structure.

SUMMARY OF THE INVENTION

However, an ink composition—including a polyfunctional acrylamide compound obtained by reaction of a N-alkoxymethyl (meth)acrylamide with a polyhydric alcohol, which is described in JP-A No. 2007-31372 and JP-A No. 2005-307198, has a problem in that the ink composition decomposes by hydrolysis to generate (meth)acrylamide during storage over time. The generation of (meth)acrylamide is desired to be reduced in order to improve the biological safety. In addition, none of the documents mentioned above teaches ejection recoverability, which refers to ejectability when ejection is resumed after a lapse of time, or flexibility of the image (film) obtained from the ink composition, and there is room for improvement in these properties. Further, there is still room for improvement in the curability of the ink composition.

The invention has been made in view of the circumstances as set forth above, and an object of the invention is to simultaneously achieve flexibility of the formed image, and storage stability, ejection recoverability and curability of the ink composition.

In order to achieve the object, aspects of the invention include the following:

<1> An ink composition including:
a polymerizable compound represented by the following Formula (1) (Component A);
a monofunctional polymerizable compound having a (meth)acrylamide structure (Component B);
a photopolymerization initiator (Component C);
a colorant (Component D); and
water (Component E),

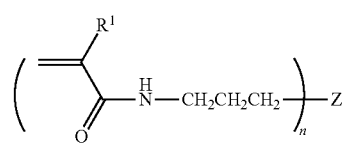

Formula (1)

In Formula (1), Z represents a polyol residue formed by removing n hydrogen atoms from hydroxyl groups of a trihydric to hexahydric polyol, $R^1$ represents a hydrogen atom or a methyl group, and n represents an integer of from 3 to 6.

<2> The ink composition according to <1>, wherein Z in Formula (1) represents a polyol residue formed by removing n hydrogen atoms from hydroxyl groups of glycerin, erythritol, xylitol, mannitol, sorbitol, pentaerythritol or dipentaerythritol.

<3> The ink composition according to <1> or <2>, wherein Component B is represented by the following Formula (2):

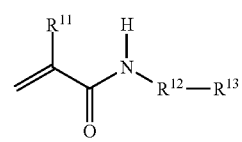

Formula (2)

In Formula (2), $R^{11}$ represents a hydrogen atom or a methyl group, $R^{12}$ represents an alkylene group, and $R^{13}$ represents an acyl group, a hydroxyl group, a tertiary amino group, a quaternary ammonium group or a sulfo group.

<4> The ink composition according to any one of <1> to <3>, wherein the mass ratio of Component A to Component B (Component A:Component B) is from 10:90 to 70:30.

<5> The ink composition according to any one of <1> to <3>, wherein the mass ratio of Component A to Component B (Component A:Component B) is from 10:90 to 40:70.

<6> The ink composition according to any one of <1> to <5>, wherein the amount of Component A is from 1 to 14% by mass relative to a total amount of the ink composition.

<7> The ink composition according to any one of <1> to <5>, wherein the amount of Component B is from 6 to 35% by mass relative to a total amount of the ink composition.

<8> The ink composition according to any one of <1> to <7>, wherein Component A is one selected from the group consisting of Polymerizable Compounds 1 to 7 represented by the following formulae Polymerizable Compound 1
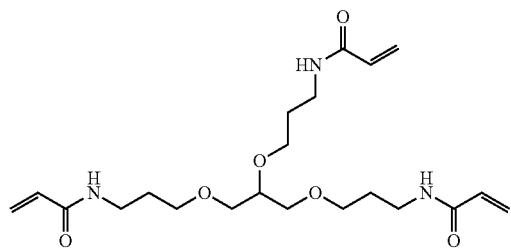
Polymerizable Compound 2
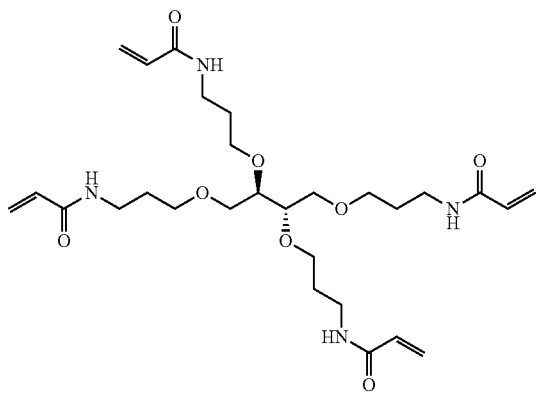
Polymerizable Compound 3
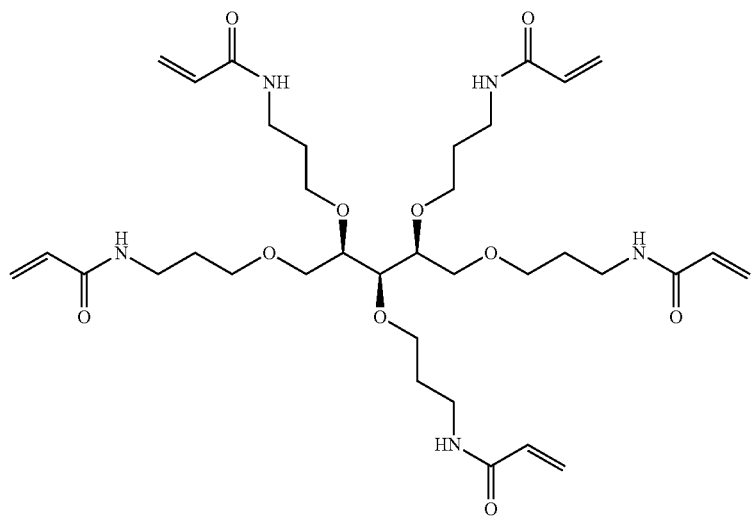
Polymerizable Compound 4
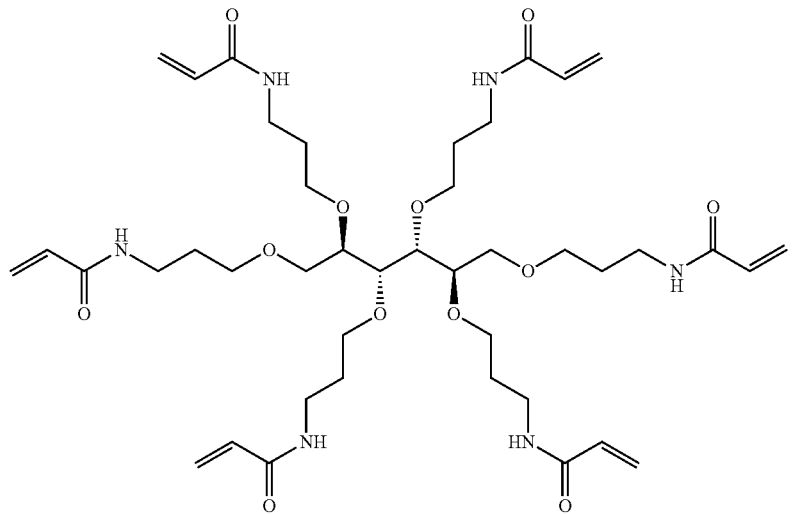

Polymerizable Compound 5
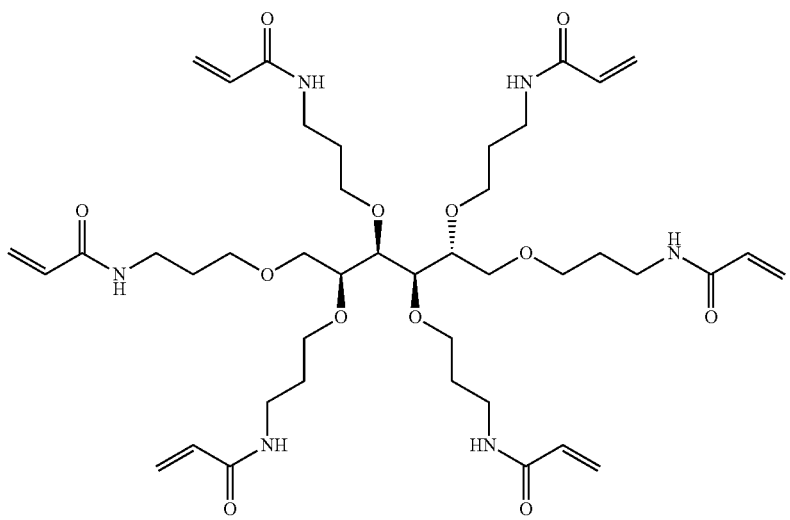
Polymerizable Compound 6
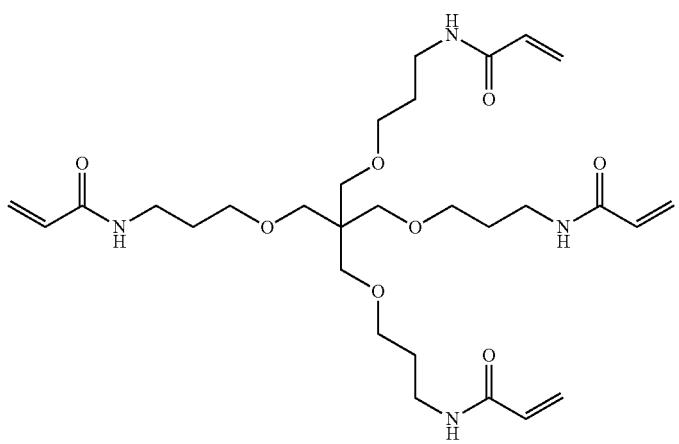
Polymerizable Compound 7
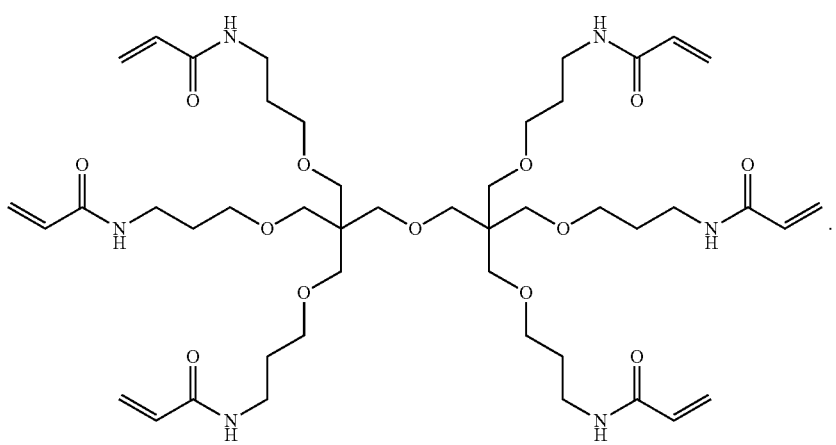

<9> The ink composition according to any one of <1> to <8>, wherein Component B is one selected from the group consisting of a monofunctional polymerizable compounds having a (meth)acrylamide structure (B-1) to (B-10)

(B-1)
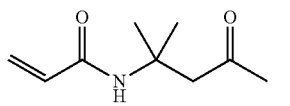

(B-2)
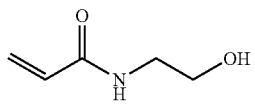

(B-3)
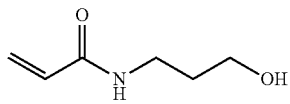

(B-4)
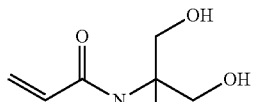

(B-5)
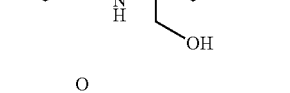

(B-6)
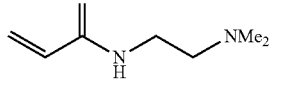

(B-7)
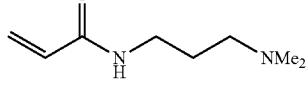

(B-8)
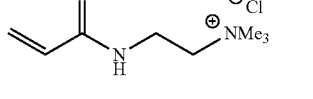

(B-9)
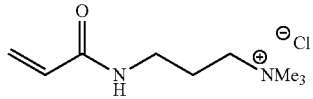

(B-10)
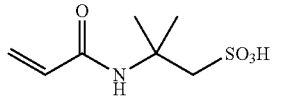

<10> The ink composition according to any one of <1> to <9>, wherein Component B is hydroxyethyl acrylamide.

<11> The ink composition according to any one of <1> to <10>, wherein Component C is a water-soluble photopolymerization initiator.

<12> The ink composition according to any one of <1> to <11>, wherein the ink composition is used for inkjet recording.

<13> An image forming method including:
applying the ink composition according to any one of <1> to <12> onto a recording medium; and
irradiating the applied ink composition with actinic energy rays.

<14> The image forming method according to <13>, wherein the applying of the ink composition includes applying the ink composition by inkjetting.

In the present specification, the range indicated by "A to B" includes the lower limit A and the upper limit B.

According to the invention, it is possible to provide an ink composition and an image forming method that can achieve flexibility of the formed image, and storage stability, ejection recoverability and curability of the ink composition, at the same time.

DETAILED DESCRIPTION OF THE INVENTION

<Ink Composition>

The ink composition according to the invention includes:
a polymerizable compound represented by following Formula (1) (Component A);
a monofunctional polymerizable compound having a (meth)acrylamide structure (Component B);
a photopolymerization initiator (Component C);
a colorant (Component D); and
water (Component E).

Formula (1)
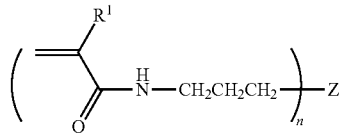

In Formula (1), Z represents a polyol residue formed by removing n hydrogen atoms from hydroxyl groups of a trihydric to hexahydric polyol, $R^1$ represents a hydrogen atom or a methyl group, and n represents an integer of from 3 to 6.

In the following, the ink composition according to the invention is explained in detail.

(Component A: Polymerizable Compound Represented by Formula (1))

The ink composition according to the invention includes a polymerizable compound represented by Formula (1) (hereinafter also referred to as "Component A").

Formula (1)
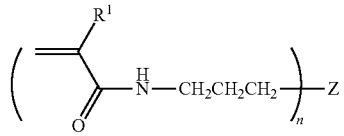

In Formula (1), Z represents a polyol residue formed by removing n hydrogen atoms from hydroxyl groups of a trihydric to hexahydric polyol, $R^1$ represents a hydrogen atom or a methyl group, and n represents an integer of from 3 to 6.

In Formula (1), $R^1$ represents a hydrogen atom or a methyl group, and preferably represents a hydrogen atom.

In Formula (1), Z represents a polyol residue formed by removing n hydrogen atoms from hydroxyl groups of a trihydric to hexahydric polyol. The polyol is further preferably a trihydric to pentahydric polyol, and particularly preferably a trihydric or tetrahydric polyol.

The polyol preferably has from 3 to 12 carbon atoms, more preferably has from 4 to 10 carbon atoms, and particularly preferably has from 4 to 6 carbon atoms. The polyol may include an ether bond within a molecule thereof.

Specific examples of the polyol include glycerin, erythritol, xylitol, mannitol, sorbitol, trimethylolethane, trimethylolpropane, ditrimethylolpropane, pentaerythritol, dipentaerythritol and tris(2-hydroxyethyl)isocyanurate. In particular, glycerin, erythritol, xylitol, mannitol, sorbitol, pentaerythritol or dipentaerythritol is preferable.

In Formula (1), n represents an integer of from 3 to 6, preferably an integer of from 3 to 5, and particularly preferably 3 or 4.

The content of Component A in the ink composition according to the invention is preferably from 1 to 45% by mass, more preferably from 1 to 14% by mass, and particularly preferably from 1 to 10% by mass, relative to the total amount of the ink composition.

Specific examples of Component A include the following Polymerizable Compounds 1 to 7.

Polymerizable Compound 1

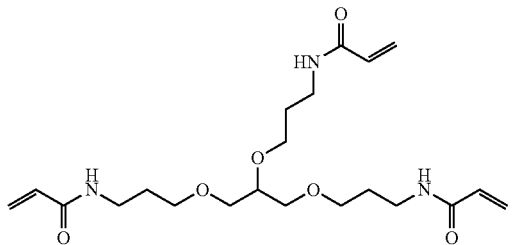

Polymerizable Compound 2

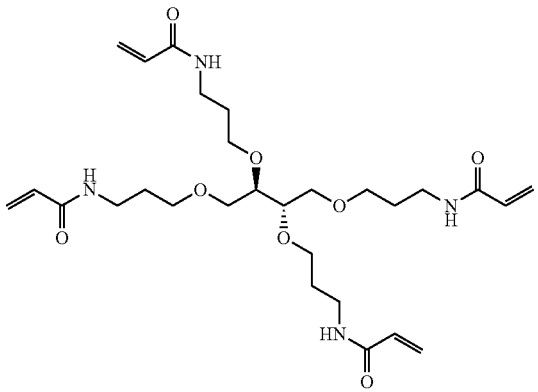

Polymerizable Compound 3

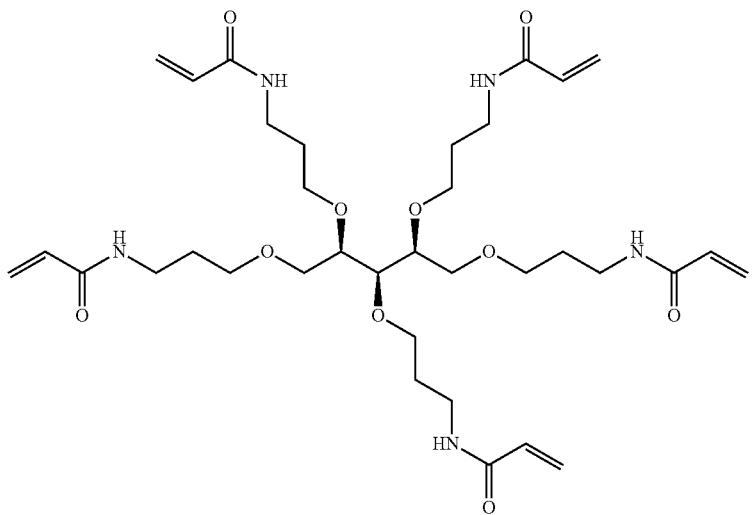

Polymerizable Compound 4

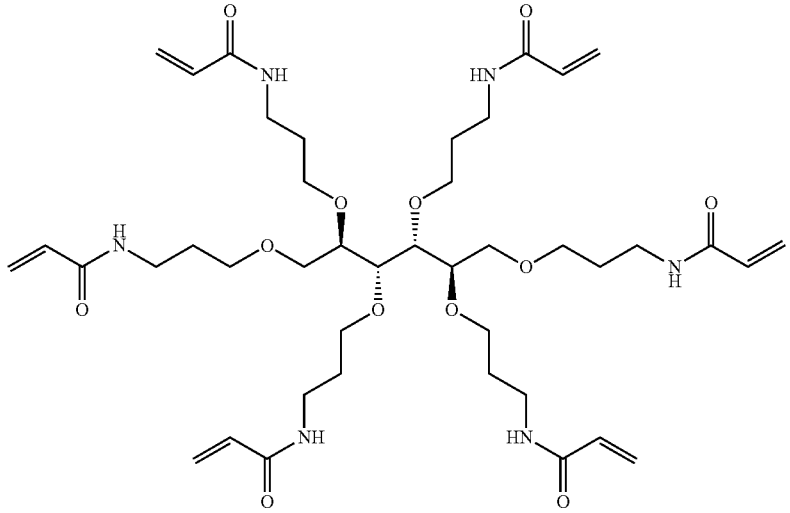

Polymerizable Compound 5
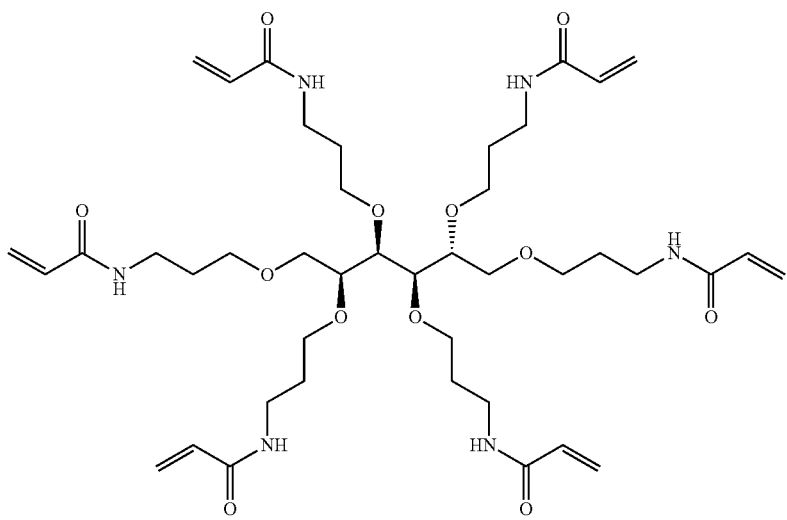
Polymerizable Compound 6
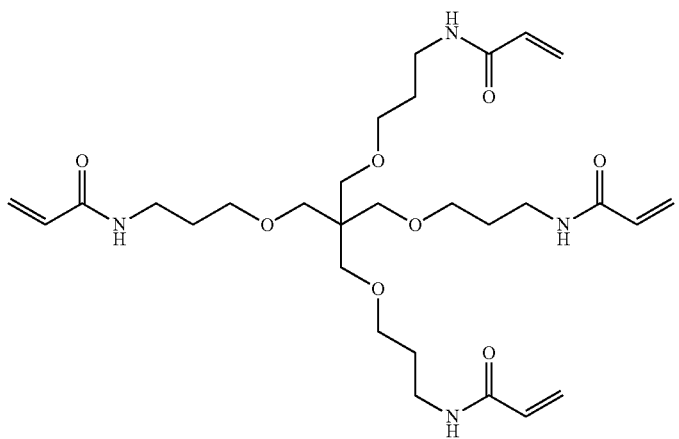
Polymerizable Compound 7
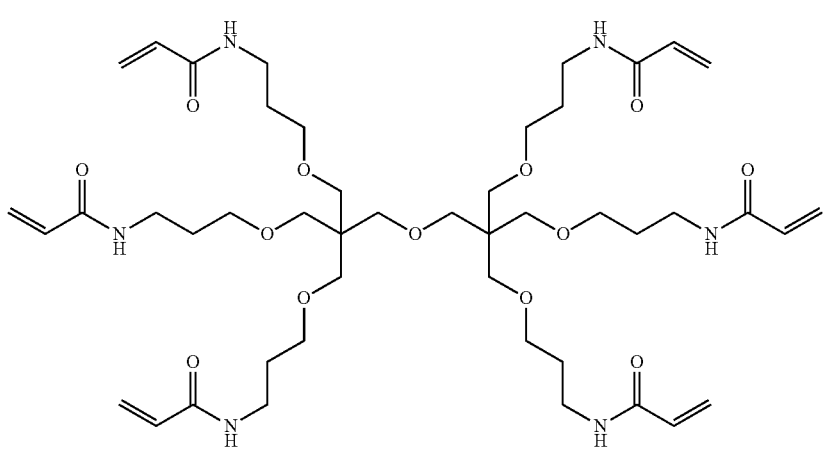

Component A can be synthesized through, for example, the following first to third processes:

a first process of obtaining a polycyano compound by a reaction of acrylonitrile with a polyol;

a second process of obtaining a polyamine compound by reduction of the polycyano compound; and a third process of obtaining a polyfunctional acrylamide compound by a reaction of the polyamine compound with acryloyl chloride.

Each of the reactions in the processes is a known reaction.

(Component B: Monofunctional Polymerizable Compound Having (Meth)Acrylamide Structure)

The ink composition according to the invention includes a monofunctional polymerizable compound having a (meth)acrylamide structure (hereinafter also referred to as Component B). The term "(meth)acrylamide" as used herein refers to acrylamide or methacrylamide.

Component B is preferably a monofunctional polymerizable compound having an acrylamide structure represented by following Formula (2).

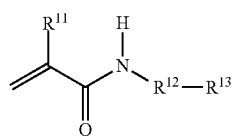

Formula (2)

In Formula (2), $R^{11}$ represents a hydrogen atom or a methyl group, $R^{12}$ represents an alkylene group, and $R^{13}$ represents an acyl group, a hydroxyl group, a tertiary amino group, a quaternary ammonium group or a sulfo group.

$R^{11}$ in Formula (2) represents a hydrogen atom or a methyl group, and preferably represents a hydrogen atom.

When $R^{12}$ in Formula (2) represents an alkylene group, the alkylene group preferably has from 1 to 6 carbon atoms, more preferably has from 2 to 4 carbon atoms, and particularly preferably has 2 or 3 carbon atoms. Examples of the alkylene group include an ethylene group and a propylene group. The alkylene group may or may not have a substituent.

A substituent that the alkylene group represented by $R^{12}$ in Formula (2) optionally has may be, for example, a methyl group or a hydroxymethyl group.

When $R^{13}$ in Formula (2) is an acyl group (—CO—R', R' representing an alkyl group), the acyl group preferably has from 2 to 4 carbon atoms, more preferably has 2 or 3 carbon atoms, and particularly preferably has 2 carbon atoms. Specific examples of the acyl group include —COCH$_3$.

When $R^{13}$ in Formula (2) represents a tertiary amino group, the tertiary amino group is represented by —NR"$_2$ (R" representing a substituent). The two substituents represented by R" in the tertiary amino group are each preferably a linear or branched alkyl group having from 1 to 8 carbon atoms, more preferably a linear or branched alkyl group having from 1 to 4 carbon atoms, and particularly preferably a linear alkyl group having 1 carbon atom or 2 carbon atoms. The two substituents represented by R" in —NR"$_2$ may be the same as each other or different from each other. Specific examples of the tertiary amino group include a dimethylamino group and a diethylamino group.

When $R^{13}$ in Formula (2) represents a quaternary ammonium group, the quaternary ammonium group is represented by —NR'''$_3^+$ (R''' representing a substituent). The three substituents represented by R''' in the quaternary ammonium group are each preferably a linear or branched alkyl group having from 1 to 8 carbon atoms, more preferably a linear or branched alkyl group having from 1 to 4 carbon atoms, and particularly preferably a linear alkyl group having 1 carbon atom or 2 carbon atoms. The three substituents represented by R''' may be the same as each other or different from each other. Specific examples of the quaternary ammonium group include a trimethylammonium group and a triethylammonium group.

When $R^{13}$ in Formula (2) represents a sulfo group, the sulfo group may be, for example, a sulfo group (—SO$_3$H) or a salt of a sulfo group (—SO$_3^-$X$^+$, X representing Li$^+$, Na$^+$, K$^+$, an ammonium cation, a tetramethylammonium cation, or the like)

$R^{13}$ in Formula (2) preferably represents an acyl group, a hydroxyl group or a dialkylamino group, and more preferably represents a hydroxyl group.

The content of Component B in the ink composition according to the invention is preferably from 1 to 45% by mass, more preferably from 6 to 35% by mass, and particularly preferably from 10 to 30% by mass, relative to the total amount of the ink composition.

The mass ratio of Component A to Component B in the ink composition according to the invention, represented by Component A:Component B, is preferably in the range of from 10:90 to 70:30, more preferably in the range of from 15:85 to 65:35, and particularly preferably in the range of from 20:80 to 55:45. From the view point of ejection recoverability, represented by Component A:Component B, is preferably in the range of from 10:90 to 40:70, more preferably in the range of from 10:90 to 35:65

Specific examples of the monofunctional polymerizable compound having a (meth)acrylamide structure and represented by Formula (2) include the following Exemplary Compounds (B-1) to (B-10).

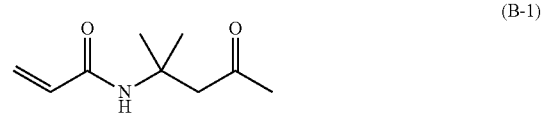
(B-1)

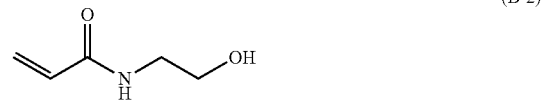
(B-2)

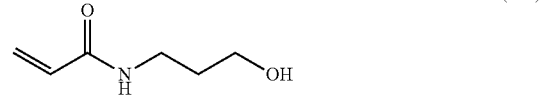
(B-3)

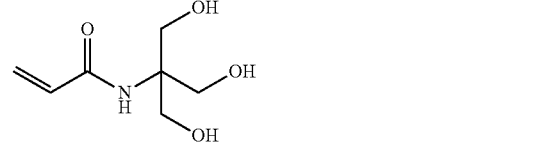
(B-4)

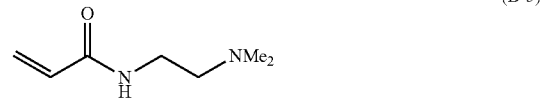
(B-5)

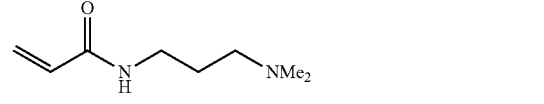
(B-6)

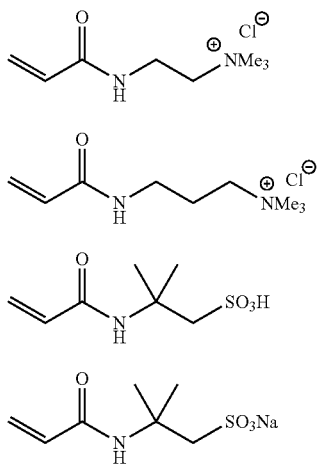

(Component C: Photopolymerization Initiator)

The ink composition according to the invention includes a photopolymerization initiator (hereinafter also referred to as "Component C"). The photopolymerization initiator may be any known photopolymerization initiator without particular restriction. The photopolymerization initiator is preferably a water-soluble photopolymerization initiator, or a water-insoluble photopolymerization initiator in the form of an aqueous dispersion, and is more preferably a water-soluble photopolymerization initiator. The water-soluble photopolymerization initiator refers to a photopolymerization initiator that has solubility in distilled water at 25° C. of 0.5% by mass or higher. The water-soluble photopolymerization initiator more preferably has a solubility in distilled water at 25° C. of 1% by mass or higher, and particularly preferably has a solubility in distilled water at 25° C. of 3% by mass or higher.

Examples of photopolymerization initiators that can be used in the ink composition according to the invention include aromatic ketones, acylphosphine compounds, aromatic onium salt compounds, organic peroxides, thio compounds, hexaaryl biimidazole compounds, ketoxime ester compounds, borate compounds, azinium compounds, metallocene compounds, active ester compounds, carbon halogen bond-containing compounds, and alkylamine compounds.

Preferred examples of aromatic ketones, acylphosphine oxide compounds and thio compounds include compounds having a benzophenone skeleton or a thioxanthone skeleton described in Radiation Curing in Polymer Science and Technology, J. P. Fouassier and J. F. Rabek, (1993), pp. 77-117. More preferred examples include α-thiobenzophenone compounds described in Japanese Examined Patent Application Publication (JP-B) No. 47-6416, benzoin ether compounds described in JP-B 47-3981, α-substituted benzoin compounds described in JP-B No. 47-22326, benzoin derivatives described in JP-B No. 47-23664, aroyl phosphonic acid esters described in JP-A No. 57-30704, dialkoxybenzophenones described in JP-B No. 60-26483, benzoin ethers described in JP-B No. 60-26403 and JP-A No. 62-81345, α-aminobenzophenones described in JP-B No. 1-34242, U.S. Pat. No. 4,318,791, European Patent No. 0284561 A1, p-di(dimethylaminobenzoyl)benzene described in JP-A No. 2-211452, thio-substituted aromatic ketones described in JP-A No. 61-194062, acylphosphine sulfides described in JP-B No. 2-9597, acylphosphines described in JP-B No. 2-9596, thioxanthones described in JP-B No. 63-61950, and coumarins described in JP-B No. 59-42864. Polymerization initiators described in JP-A No. 2008-105379 and JP-A No. 2009-114290 are also preferred. Further examples include polymerization initiators described in Ultraviolet Curing System, authored by Kiyomi Kato, published by Kabushiki Kaisha Sogo Gijutsu Center in 1989, pp. 65-148.

Among these, a photopolymerization initiator suitable for the ink composition according to the invention is an aromatic ketone or an acylphosphine oxide compound. In particular, p-phenylbenzophenone (manufactured by Wako Pure Chemical Industries, Ltd.), IRGACURE 819 (trade name, manufactured by BASF Japan Ltd.), DAROCUR TPO (trade name, manufactured by BASF Japan Ltd.), IRGACURE 369 (trade name, manufactured by BASF Japan Ltd.), IRGACURE 907 (trade name, manufactured by BASF Japan Ltd.) and IRGACURE 2959 (trade name, manufactured by BASF Japan Ltd.) are preferred, and IRGACURE 2959 (trade name, manufactured by BASF Japan Ltd.) is most preferred from the viewpoints of water solubility and hydrolysis resistance.

The ink composition according to the invention may include only one photopolymerization initiator, or may include two or more photopolymerization initiators.

The content of photopolymerization initiator in the ink composition according to the invention is preferably from 0.1 to 20% by mass, more preferably from 0.5 to 10% by mass, and particularly preferably from 1.0 to 5% by mass, relative to the total amount of solids contained in the ink composition.

(Component D: Colorant)

The ink composition according to the invention includes a colorant (hereinafter also referred to as "Component D"). The colorant may be any known dye, pigment or the like, without particular restriction. In particular, from the viewpoint of ink coloring properties, colorant that is nearly insoluble or hardly soluble in water is preferred. Specific examples of the colorant include pigments, dispersed dyes, oil-soluble dyes and dyes that form J-aggregates. Among these, pigments are particularly preferred in view of light fastness.

The ink composition according to the invention may include any known organic pigment or inorganic pigment without particular restriction.

Examples of the organic pigment include azo pigments, polycyclic pigments, dye chelates, nitro pigments, nitroso pigments, and aniline black. Among these, azo pigments, polycyclic pigments and the like are preferred. Examples of azo pigments include azo lakes, insoluble azo pigments, condensed azo pigments and chelate azo pigments. Examples of polycyclic pigments include phthalocyanine pigments, perylene pigments, perinone pigments, anthraquinone pigments, quinacridone pigments, diketopyrrolopyrrole pigments, dioxazine pigments, indigo pigments, thioindigo pigments, isoindolinone pigments, and quinophthalone pigments. Examples of dye chelates include basic dye chelates and acidic dye chelates.

Examples of the inorganic pigment include titanium oxide, iron oxide, calcium carbonate, barium sulfate, aluminum hydroxide, barium yellow, cadmium red, chrome yellow and carbon black. Among these, carbon black is particularly preferred, and carbon black produced by a known method, such as a contact method, a furnace method or a thermal method, can be used.

Examples of pigments that can be used in the ink composition according to the invention include pigments described in paragraphs [0142] to [0145] of JP-A No. 2007-100071.

The ink composition according to the invention may include only one colorant, or may include a combination of two or more colorants, each of which may be selected from the same colorant group or different colorant groups from among the colorant groups described above.

From the viewpoint of color density, granularity, ink stability and ejection reliability, the content of colorant in the ink composition according to the invention is preferably from 0.5 to 20% by mass, more preferably from 1 to 15% by mass, and particularly preferably from 2 to 10% by mass, relative to the total mass of the ink composition.

(Dispersant)

When a pigment is used as a colorant in the ink composition according to the invention, the pigment is preferably in the form of a dispersion of colored particles in which colored particles are dispersed in an aqueous medium with a dispersant. The dispersant may be a polymeric dispersant or a surfactant-type dispersant having a low molecular weight. The polymeric dispersant may be a water-soluble polymeric dispersant or a water-insoluble polymeric dispersant. The dispersion of colored particles may be a dispersion of colored particles coated with a crosslinked polymer, which is obtained by dispersing a pigment in an aqueous medium with a polymeric dispersant and then adding a crosslinking agent to allow the polymeric dispersant molecules to crosslink with each other.

In view of dispersion stability of pigment particles and ejectability of the ink composition when it is applied to an inkjet method, the colored particles (pigment particles) dispersed in the ink composition according to the invention are preferably dispersed with a water-insoluble polymeric dispersant, or coated with a crosslinked polymer.

(Water-Insoluble Polymeric Dispersant)

The ink composition according to the invention may include a water-insoluble polymeric dispersant that enables dispersion of a pigment, as necessary. The water-insoluble polymeric dispersant is not particularly restricted as long as it can disperse a pigment, and any known water-insoluble polymeric dispersant can be used. The water-insoluble polymeric dispersant is a polymer that includes a hydrophobic structural unit and a hydrophilic structural unit.

Examples of the monomer for forming the hydrophobic structural unit include styrenic monomers, alkyl (meth)acrylates and aromatic group-containing (meth)acrylates.

The monomer for forming the hydrophilic structural unit is not particularly restricted as long as it is a monomer including a hydrophilic group, and examples of the hydrophilic group include a nonionic group, a carboxyl group, a sulfonic acid group, and a phosphoric acid group. Examples of the nonionic group include a hydroxyl group, an amido group (in which the nitrogen atom is not substituted), a group derived from an alkylene oxide polymer (such as polyethylene oxide or polypropylene oxide) and a group derived from a sugar alcohol.

From the viewpoint of dispersion stability, the hydrophilic structural unit preferably has at least a carboxyl group. In a preferable embodiment, the hydrophilic structural unit has both a nonionic group and a carboxyl group.

Specific examples of the water-insoluble polymeric dispersant include a styrene-(meth)acrylic acid copolymer, a styrene-(meth)acrylic acid-(meth)acrylic ester copolymer, a (meth)acrylic ester-(meth)acrylic acid copolymer, a polyethylene glycol (meth)acrylate-(meth)acrylic acid copolymer, and a styrene-maleic acid copolymer.

As used herein, "(meth)acrylic acid" refers to acrylic acid or methacrylic acid.

From the viewpoint of dispersion stability of the pigment, the water-insoluble polymeric dispersant is preferably a vinyl polymer having a carboxyl group, and is more preferably a vinyl polymer including, as a hydrophobic structural unit, a structural unit derived from an aromatic group-containing monomer, and including, as a hydrophilic structural unit, a structural unit having a carboxyl group.

From the viewpoint of dispersion stability of the pigment, the weight average molecular weight of the water-insoluble polymeric dispersant is preferably from 3,000 to 200,000, more preferably from 5,000 to 100,000, still more preferably from 5,000 to 80,000, and particularly preferably from 10,000 to 60,000.

The weight average molecular weight is measured by gel permeation chromatograph (GPC). For the measurement, HLC-8020GPC (trade name, manufactured by Tosoh Corporation) as a GPC, TSKGEL SUPER HZM-H, TSKGEL SUPER HZ4000, TSKGEL SUPER HZ200 (trade names, manufactured by Tosoh Corporation, 4.6 mmID×15 cm) as columns, and THF (tetrahydrofuran) as an eluent are used.

The content of dispersant is preferably from 10 to 100% by mass, more preferably from 20 to 70% by mass, and particularly preferably from 30 to 50% by mass, relative to the pigment.

When the content of the dispersant relative to the pigment is within the above range, pigment particles are coated with an appropriate amount of dispersant, as a result of which colored particles that exhibit excellent dispersibility, excellent dispersion stability and excellent coloring properties can be obtained.

In addition to the water-insoluble polymeric dispersant, the colored particles may further include a dispersant other than the water-insoluble polymeric dispersant. For example, a known water-soluble low-molecular-weight dispersant, a water-soluble polymer, or the like may be used. Dispersants other than the water-insoluble polymeric dispersant may be used in an amount such that the total amount of dispersants, including the amount of the water-insoluble polymeric dispersant, is within the above-described content range for dispersant.

The colorant in the ink composition according to the invention preferably includes the pigment and the water-insoluble polymeric dispersant, and is preferably a colored particle which is formed by the pigment and the water-insoluble polymeric dispersant, and in which the water-insoluble polymeric dispersant covers at least a part of the surface of the pigment. The colored particles may be obtained as a dispersion of colored particles by, for example, dispersing a mixture of a pigment, a dispersant and one or more optional ingredients such as a solvent (preferably an organic solvent), using a dispersion machine.

The dispersion of colored particles may be produced as a dispersion by, for example, adding an aqueous solution containing a basic substance to a mixture of the pigment, the water-insoluble polymeric dispersant, and an organic solvent that dissolves or disperses the dispersant (a mixing/hydration process), and thereafter removing the organic solvent (a solvent removal process). According to this method, a dispersion of colored particles in which the pigment is finely dispersed, and which exhibits excellent storage stability, can be obtained.

The volume average particle size of the dispersion of colored particles is preferably from 10 to 200 nm, more preferably from 10 to 150 nm, and particularly preferably from 10 to 100 nm. When the volume average particle size is 200 nm or less, favorable color reproducibility can be achieved, and, when the dispersion of colored particles (ink composition) is applied to an inkjet method, favorable ejectability can be achieved. When the volume average particle size is 10 nm or more, favorable light fastness can be achieved.

The particle size distribution of the colorant (or colored particles) is not particularly restricted, and may be either a broad particle size distribution or a monodisperse particle size distribution. It is also possible to use a mixture of two or more kinds of colorants each having a monodisperse particle size distribution.

The volume average particle size and the particle size distribution of the colorant (or colored particles) can be measured by, for example, a light scattering method.

In the ink composition according to the invention, the colorant (or colored particles) may be used singly or in combination of two or more kinds thereof.

(Component E: Water)

The ink composition according to the invention includes water (hereinafter also referred to as "Component E"). In the ink composition according to the invention, water that does not include ionic impurities, such as ion exchanged water or distilled water, is preferably used. The content of water in the ink composition according to the invention is preferably from 10 to 95% by mass, more preferably from 30 to 90% by mass, and particularly preferably from 50 to 80% by mass, relative to the total amount of the ink composition.

(Water-Soluble Organic Solvent)

The ink composition according to the invention may include a water-soluble organic solvent, as necessary. Use of a water-soluble organic solvent may produce an effect in terms of preventing drying or promoting penetration can be expected. A water-soluble organic solvent as a drying inhibitor may be used for preventing clogging of ink ejection ports by drying and solidification of the ink composition when the ink composition has adhered to a portion in the vicinity of ink ejection ports of ejection nozzles. A water-soluble organic solvent having a lower vapor pressure than that of water is suitable as a drying inhibitor. A water-soluble organic solvent as a penetration promoter may be used for enhancing penetration of the ink composition into paper.

Examples of the water-soluble organic solvent include alkanediols (polyhydric alcohols) such as glycerin, 1,2,6-hexanetriol, trimethylolpropane, ethylene glycol and propylene glycol; sugar alcohols; alkyl alcohols having from 1 to 4 carbon atoms such as ethanol, methanol, butanol, propanol and isopropanol; and glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, ethylene glycol mono-t-butyl ether, diethylene glycol mono-t-butyl ether, triethylene glycol monoethyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol, dipropylene glycol monomethyl ether, dipropylene glycol monoethyl ether, dipropylene glycol mono-n-propyl ether, dipropylene glycol mono-isopropyl ether and tripropylene glycol monomethyl ether. These water-soluble organic solvents may be used singly, or in combination of two or more thereof.

For the purpose of preventing drying, polyhydric alcohols are effective, and examples thereof include glycerin, ethylene glycol, diethylene glycol, triethylene glycol, propylene glycol, dipropylene glycol, tripropylene glycol, 1,3-butanediol and 2,3-butanediol. These polyhydric alcohols may be used singly, or in combination of two or more thereof.

For the purpose of promoting penetration, aliphatic diols are effective, and examples thereof include 2-ethyl-2-methyl-1,3-propanediol, 3,3-dimethyl-1,2-butanediol, 2,2-diethyl-1,3-propanediol, and 2-ethyl-1,3-hexanediol, 2,2,4-trimethyl-1,3-pentanediol. Among these, 2-ethyl-1,3-hexanediol and 2,2,4-trimethyl-1,3-pentanediol are preferred examples.

From the viewpoint of suppressing curling of a recording medium, the ink composition according to the invention preferably includes at least one compound having a structure represented by the following Structural Formula (X) as a water-soluble organic solvent.

Structural Formula (X)

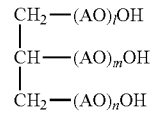

In Structural Formula (X), l, m and n each independently represent an integer of 1 or greater, and the sum thereof, i.e., l+m+n, is in the range of from 3 to 15, preferably in the range of from 3 to 12, and more preferably in the range of from 3 to 10. When the value of l+m+n is 3 or greater, curling can be favorably suppressed, and when the value of l+m+n is 15 or smaller, favorable ejectability can be achieved. In Structural Formula (X), AO represents at least one of ethyleneoxy (EO) or propyleneoxy (PO), and preferably represents a propyleneoxy group. Each AO in $(AO)_l$, $(AO)_m$ and $(AO)_n$ may be the same as or different from each other.

Exemplary compounds represented by Structural Formula (X) include the compounds shown below. In the exemplary compounds shown below, the expression "POP (3) glyceryl ether" refers to a glyceryl ether in which a total of three propyleneoxy groups are bonded to glycerin, and other expressions should be interpreted in a similar manner.

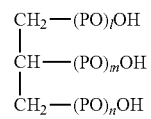

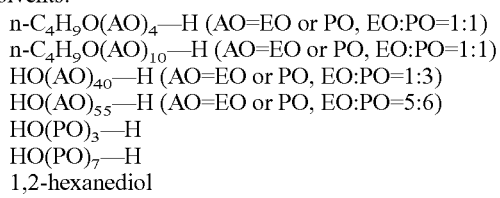

From the viewpoint of suppressing curling of a recording medium, the water-soluble organic solvent preferably includes at least one of the following water-soluble organic solvents.

n-$C_4H_9O(AO)_4$—H (AO=EO or PO, EO:PO=1:1)
n-$C_4H_9O(AO)_{10}$—H (AO=EO or PO, EO:PO=1:1)
HO$(AO)_{40}$—H (AO=EO or PO, EO:PO=1:3)
HO$(AO)_{55}$—H (AO=EO or PO, EO:PO=5:6)
HO$(PO)_3$—H
HO$(PO)_7$—H
1,2-hexanediol The total content of the compound represented by Structural Formula (X) and the exemplary compounds shown above is preferably 3% by mass or more, more preferably 4% by mass or more, and further preferably 5% by mass or more, relative to the total amount of water-soluble organic solvents. When the total content is within the range, curling can be suppressed without affecting the stability or the ejectability of the ink.

The ink composition according to the invention may include only one water-soluble organic solvent, or a mixture of two or more thereof.

The content of water-soluble organic solvent is preferably from 0 to 40% by mass, more preferably from 0 to 20% by mass, and particularly preferably from 0 to 10% by mass, relative to the total amount of the ink composition.

(Resin Particles)

The ink composition according to the invention may include at least one kind of resin particles, as necessary.

Examples of the resin of the resin particles include an acrylic resin, a vinyl acetate resin, a styrene-butadiene resin, a vinyl chloride resin, an acryl-styrene resin, a butadiene resin, a styrene resin, a crosslinked acrylic resin, a crosslinked styrene resin, a benzoguanamine resin, a phenol resin, a silicone resin, an epoxy resin, a urethane resin, a paraffin resin, a fluorinated resin, and latices thereof. Among these, preferable examples include an acrylic resin, an acryl-styrene resin, a styrene resin, a crosslinked acrylic resin or a crosslinked styrene resin.

The weight average molecular weight of the resin particles is preferably from 10,000 to 200,000, more preferably from 100,000 to 200,000.

The volume average particle size of the resin particles is preferably from 10 nm to 1 μm, more preferably from 15 nm to 200 nm, and particularly preferably from 20 nm to 50 nm.

The glass transition temperature of the resin particles is preferably 30° C. or higher, more preferably 40° C. or higher, and particularly preferably 50° C. or higher.

The content of resin particles is preferably from 0 to 20% by mass, more preferably from 0 to 10% by mass, and particularly preferably from 0 to 5% by mass, relative to the total amount of the ink composition.

The particle size distribution of the resin particles is not particularly restricted, and may be a broad particle size distribution or a monodisperse particle size distribution. It is also possible to use a mixture of two or more kinds of resin particles each having a monodisperse particle size distribution.

(Surfactant)

The ink composition according to the invention may include at least one surfactant as a surface tension adjuster, as necessary.

Any of an anionic surfactant, a cationic surfactant, an amphoteric surfactant, a nonionic surfactant or a betaine surfactant may be used as the surfactant.

It is also possible to use the above-described dispersant, such as the above-described polymeric dispersant, as a surfactant.

In the ink composition according to the invention, inclusion of a nonionic surfactant is preferred, and inclusion of an acetylene glycol derivative is particularly preferred.

When the ink composition according to the invention includes a surfactant (surface tension adjuster), from the viewpoint of achieving favorable ejection of the ink composition by an inkjet method, the amount of surfactant contained in the ink composition is preferably an amount such that the surface tension of the ink composition can be adjusted to be in the range of from 20 to 60 mN/m, more preferably in the range of from 20 to 45 mN/m, and particularly preferably in the range of from 25 to 40 mN/m.

Apart from the preferability of a content of surfactant within a content range that provides a surface tension within the above surface tension range, the content of surfactant in the ink composition according to the invention is not particularly restricted, and the content of surfactant is preferably 1% by mass or more, more preferably from 1 to 10% by mass, and particularly preferably from 1 to 3% by mass, relative to the total amount of the ink composition.

(Other Components)

In addition to the components described above, the ink composition may further include various additives as other components, as necessary.

Examples of other components include various known additives such as an ultraviolet absorbent, a color fading inhibitor, a mildew-proofing agent, a pH adjuster, an antirust agent, an antioxidant, an emulsification stabilizer, an antiseptic agent, a defoamant, a viscosity adjuster, a dispersion stabilizer, a chelating agent and a solid wetting agent.

Examples of the ultraviolet absorbent include a benzophenone ultraviolet absorbent, a benzotriazole ultraviolet absorbent, a salicylate ultraviolet absorbent, a cyanoacrylate ultraviolet absorbent and a nickel complex ultraviolet absorbent.

Examples of the color fading inhibitor include various kinds of organic color fading inhibitors and various metal complex color fading inhibitors. Examples of organic color fading inhibitors include a hydroquinone, an alkoxyphenol, a dialkoxyphenol, a phenol, an aniline, an amine, an indane, a chromane, an alkoxyanilines and a heterocyclic compound. Examples of metal complex color facing inhibitors include a nickel complex and a zinc complex.

Examples of the mildew-proofing agent include sodium dehydroacetate, sodium benzoate, sodium pyridinethion-1-oxide, ethyl p-hydroxybenzoate, 1,2-benzisothiazolin-3-one, sodium sorbate and sodium pentachlorophenolate. The content of mildew-proofing agent in the ink composition is preferably from 0.02 to 1.00% by mass relative to the total amount of the ink composition.

The pH adjuster is not particularly restricted as long as it is a compound that can adjust the pH to a desired value without adversely affecting the ink composition. Examples of the pH adjuster include an alcohol amine (such as diethanol amine, triethanol amine, or 2-amino-2-ethyl-1,3-propanediol), an alkali metal hydroxide (such as lithium hydroxide, sodium hydroxide or potassium hydroxide), an ammonium hydroxide (such as ammonium hydroxide or a quaternary ammonium hydroxide), phosphonium hydroxide and an alkali metal carbonate.

Examples of the antirust agent include an hydrogen sulfite salt, sodium thiosulfate, ammonium thiodiglycolate, diisopropyl ammonium nitrite, pentaerythritol tetranitrate and dicyclohexyl ammonium nitrite.

Examples of the antioxidant include a phenolic antioxidant (including a hindered phenolic antioxidant), an amine-containing antioxidant, a sulfur-containing antioxidant and a phosphorus-containing antioxidant.

Examples of the chelating agent include a sodium salt of ethylenediaminetetraacetic acid, a sodium salt of nitrilotriacetic acid, a sodium salt of N-(2-hydroxyethyl)ethylenediaminetriacetic acid, a sodium salt of diethylenetriaminepentaacetic acid and a sodium salt of uramildiacetic acid.

The inventors of the present invention have found that the effect of the invention can be achieved by using an ink composition including a polymerizable compound represented by Formula (1) (Component A), a monofunctional polymerizable compound having a (meth)acrylamide structure (Component B), a photopolymerization initiator (Component C), a colorant (Component D) and water (Component E).

The mechanism has not yet been fully clarified, but the inventors presume the mechanism to be as follows. Specifically, the inventors presume:

that a propylene group as a linking group which links the polyol residue and a (meth)acrylamide group in Component A suppresses hydrolysis and improves the storage stability of the ink composition, that use of Component A, which is a tri- or higher-valent polymerizable compound, improves the polymerizability and curability;

that use of Component B, which is a monofunctional polymerizable compound, alleviates rise in the viscosity of the ink composition caused by concentration of the ink composition due to evaporation of water when ejection areas are left to stand after ejection of the ink composition, and the use of Component B thus improves ejection recoverability, and that although use of Component A alone in the ink composition leads to formation of a rigid crosslinked structure and formation of a fragile cured film, use of Component A and Component B in combination decreases the crosslinking density in the cured film and thus imparts an appropriate flexibility to the cured film.

It should be noted that the aforementioned mechanism is only a presumption, and the invention is not restricted to the mechanism.

<Image Forming Method>

The image forming method according to the invention includes an ink application process, in which the ink composition as described above is applied onto a recording medium, and an irradiation process, in which the applied ink composition is irradiated with actinic energy rays.

(Recording Medium)

Recording media that can be used in the image forming method according to the invention are not particularly restricted, and examples thereof include: ordinary printing paper consisting primarily of cellulose, such as fine paper, coated paper or art paper; non-absorptive resin materials for use in soft packaging, resin supports made of a resin material formed into a plate, and resin films obtained by shaping resin materials into films. Examples of the resin films include a PET film, an OPS film, an OPP film, an ONy film, a PVC film, a PE film, and a TAC film. Other examples of resins that can be used as recording media include polycarbonate, acrylic resin, ABS, polyacetal, PVA, and rubbers. Metals and glasses are also usable as recording media.

(Ink Application Process)

In the ink application process of the image forming method according to the invention, the ink composition is applied onto a recording medium. The method of applying the ink composition is not particularly restricted, and any known ink application method can be used as long as the ink composition can be applied in a pattern of a desired image. The method may be, for example, relief printing, planographic printing, intaglio printing, stencil printing, screen printing or inkjet printing. From the viewpoint of downsizing a recording apparatus and enabling high-speed printing, the application of the ink composition in the ink application process is preferably carried out by an inkjet method.

(Inkjet Method)

In the inkjet method, a color image is formed on a recording medium by ejecting the ink composition from a head by applying energy to the ink composition.

The inkjet method employed in the image forming method according to the invention is not particularly restricted, and may be a known method. For example, any of a charge control method in which ink is ejected using an electrostatic attraction force, a drop-on-demand method (a pressure pulse method) in which an oscillation pressure of a piezo element is employed, or an acoustic method in which acoustic beams generated by conversion of electric signals are irradiated to ink so as to eject the ink using a radiation pressure generated by the irradiation, may be applied to the inkjet method.

The inkjet method may be either an on-demand method or a continuous method. The type of ink nozzles etc. is not particularly restricted, and may be selected as appropriate according to the intended use.

The scope of the inkjet method includes a method in which a large number of small-volume droplets of an ink having low color density (photo ink) are ejected, a method in which the image quality is improved by using plural inks having substantially the same color hue but at different densities, and a method in which a colorless, transparent ink is used.

The inkjet method includes a shuttle method, in which recording is carried out while moving a short serial head in the width direction of a recording medium, and a line method, in which a line head having recording devices arranged so as to cover the entire width of a recording medium is used. In the line method, an image can be recorded on an entire one surface of a recording medium by moving the recording medium in a direction orthogonal to the direction in which the recording elements are arranged, as a result of which a movement system for moving the short head, such as a carriage, is unnecessary. In addition, in the line method, a complex control of the scanning movement involving the movement of the carriage and the recording medium is unnecessary, and only the recording medium is moved, as a result of which the printing speed can be increased as compared with the shuttle method.

In the image forming method according to the invention, an inkjet method described in paragraphs [0093] to [0105] of JP-A No. 2003-306623 may be employed.

(Actinic Energy Ray Irradiation Process)

The image forming method according to the invention includes a process in which the ink composition that has been applied onto the recording medium is irradiated with actinic energy rays. By carrying out the actinic energy ray irradiation, the polymerizable compound cures to form a cured film including a colorant, thereby fixing the image.

Examples of the actinic energy rays used in the invention include α-rays, γ-rays, electron beams, X-rays, ultraviolet rays, visible rays and infrared rays. The wavelength of the actinic energy rays is, for example, preferably from 200 to 600 nm, more preferably from 250 to 450 nm, and particularly preferably from 250 to 400 nm.

The output of the actinic energy rays is preferably 5000 mJ/cm$^2$ or less, more preferably from 10 to 4000 mJ/cm$^2$, and particularly preferably from 20 to 3000 mJ/cm$^2$.

Known sources for actinic energy rays include mercury lamps and gas/solid lasers. Light sources used to cure ultraviolet-curable inkjet recording inks are mainly mercury lamps and metal halide lamps. However, from the viewpoint of environmental conservation, replacement with mercury-free light sources is strongly desired, and replacement with GaN-semiconductor ultraviolet light emitting diode is quite effective from the industrial and environmental viewpoints. Since LEDs (UV-LEDs) and LDs (UV-LDs) are small-sized, have a long life and high efficiency, and incur low costs, these devices are thought to be suitable as light sources for photo-curing inkjet.

Light-emitting diodes (LEDs) and laser diodes (LDs) are usable as actinic energy ray sources. In particular, when an ultraviolet ray source is required, a ultraviolet LED or a ultraviolet LD may be used. For example, violet-emitting LEDs of which the main emission spectrum is within a wavelength range of from 365 nm to 420 nm are available from Nichia Corporation.

The actinic energy ray source used in the image forming method according to the invention is preferably a mercury lamp or a metal halide lamp.

(Ink Drying Process)

The image forming method according to the invention may include an ink drying process, in which the ink solvent (such as water or organic solvent) in the ink composition that has been applied onto a recording medium is removed by drying, as necessary.

The ink drying process may be carried out after the ink application process, and may be carried out before or after the actinic energy ray irradiation process. The ink drying process is preferably carried out before the actinic energy ray irradiation process.

The method of drying the ink is not particularly restricted as long as at least a portion of the ink solvent can be removed, and any ordinarily-employed method may be applied. For example, the ink drying can be carried out by heating with a heater or the like, air blowing with a drier or the like, or by a combination thereof.

EXAMPLES

In the following, the invention is explained in further detail with reference to examples. However, the invention is not limited to these examples. Unless otherwise specified, "parts" and "%" are on the mass basis.

(Synthesis of Polymeric Dispersant P-1)

Methyl ethyl ketone (88 g) was added to a 1000-ml three-neck flask equipped with a stirrer and a condenser, and was heated to 72° C. under a nitrogen atmosphere. Then, a solution prepared by dissolving dimethyl 2,2'-azobisisobutyrate (0.85 g), benzyl methacrylate (60 g), methacrylic acid (10 g) and methyl methacrylate (30 g) in methyl ethyl ketone (50 g) was dropwise added into the flask over three hours. After the completion of the dropwise addition, the reaction was allowed to continue for another one hour. Thereafter, a solution prepared by dissolving dimethyl 2,2'-azobisisobutylate (0.42 g) in methyl ethyl ketone (2 g) was added thereto, and the reaction liquid was heated at 78° C. for four hours. The reaction solution obtained was reprecipitated twice with a large excess of hexane, and the precipitated resin was dried, as a result of which 96 g of polymeric dispersant P-1 was obtained.

The composition of the resin obtained was confirmed by $^1$H-NMR, and the weight average molecular weight (Mw) of the resin as measured by GPC was 44,600. The acid value of the resin as measured by the method described in the JIS standard (JIS K0070:1992) was 65.2 mgKOH/g.

(Preparation of Dispersion of Resin-Coated Pigment)
—Resin-Coated Cyan Pigment Dispersion—

Pigment Blue 15:3 (PHTHALOCYANINE BLUE A220, trade name, manufactured by Dainichiseika Color & Chemicals Mfg. Co., Ltd.) (10 parts), polymeric dispersant P-1 (5 parts), methyl ethyl ketone (42 parts), 1 mol/L NaOH aqueous solution (5.5 parts) and ion exchanged water (87.2 parts) were mixed, and the mixture was dispersed with a bead mill using zirconia beads having a diameter of 0.1 mm for 2 to 6 hours.

The methyl ethyl ketone and part of the water were removed from the resultant dispersion under reduced pressure at 55° C., as a result of which a dispersion of a resin-coated cyan pigment (colored particles) having a pigment concentration of 10.2% by mass was obtained.

—Resin-Coated Magenta Pigment Dispersion—

A dispersion of a resin-coated magenta pigment (colored particles) was obtained in the same manner as in the preparation of the dispersion of a resin-coated cyan pigment described above, except that the PHTHALOCYANINE BLUE A220 as a pigment was replaced by the same amount of CHROMOPHTHAL JET MAGENTA DMQ (trade name, manufactured by BASF Japan Ltd.), which is Pigment Red 122.

—Resin-Coated Yellow Pigment Dispersion—

A dispersion of a resin-coated yellow pigment (colored particles) was obtained in the same manner as in the preparation of the dispersion of a resin-coated cyan pigment described above, except that the PHTHALOCYANINE BLUE A220 as a pigment was replaced by the same amount of IRGALITE YELLOW GS (trade name, manufactured by BASF Japan Ltd.), which is Pigment Yellow 74.

(Synthesis of Polymerizable Compound)
—Synthesis of Polymerizable Compound 1—
(First Process)

Glycerin (10.0 g), toluene (100 ml) and a 50% potassium hydroxide aqueous solution (7.3 g) were added into a 500-ml three-neck flask, and the contents of the flask were stirred while the flask was placed in a water bath. Subsequently, acrylonitrile (43.2 g) was dropwise added thereto over two hours while maintaining the temperature in the flask at from 20 to 25° C. After the completion of the dropwise addition, the contents of the flask were stirred for 1.5 hours. Thereafter, the resultant reaction mixture was allowed to separate, and the resultant aqueous layer was removed. Magnesium sulfate was added to the organic layer obtained, thereby adequately drying the organic layer. The organic layer was then subjected to celite filtration. The filtrate was concentrated under reduced pressure, as a result of which 25.9 g of a polycyano compound was obtained (yield: 95%). The obtained polycyano compound was used, without purification, in the following reduction reaction.

(Second Process)

The polycyano compound (25.0 g) obtained above, Ni catalyst (RANEY NI 2400, trade name, manufactured by W.R. Grace & Co.) (25.0 g), methanol (300 ml) and a 25% ammonia water (300 ml) were added into a 1 L autoclave, and stirred. After purging the inside of the autoclave with nitrogen, hydrogen was introduced into the autoclave to have a hydrogen partial pressure of 5 MPa, and the contents of the autoclave were allowed to react at 25° C. for 16 hours. The resultant reaction solution was subjected to celite filtration to remove the Ni catalyst. A polyamine compound (24.5 g, yield: 98%) was obtained by concentrating the filtrate under reduced pressure. The obtained polyamine compound was used, without purification, in the following reaction.

(Third Process)

The polyamine compound (24.0 g) obtained above, triethylamine (41.5 g) and chloroform (300 mL) were added to a 1 L three-neck flask, and were stirred while cooled in an ice bath. Subsequently, acryloyl chloride (29.7 g) was dropwise added thereto while the temperature inside the flask was maintained at 10° C. or lower. After the completion of the dropwise addition, the contents of the flask were stirred at room temperature for two hours. The resultant reaction mixture was separated by adding a saturated ammonium chloride aqueous solution (300 ml), and the resultant aqueous layer was extracted three times using 300 ml of chloroform. Magnesium sulfate was added to the organic layer obtained, thereby adequately drying the organic layer. The organic layer was then subjected to celite filtration. After the filtrate was concentrated under reduced pressure, purification using silica gel column chromatography (ethyl acetate:methanol=85:15) was carried out, as a result of which 20.5 g of polymerizable compound 1 (colorless liquid, yield: 53%), which is the target compound, was obtained. The yield through the three processes was 49%. The synthesis scheme is shown below.

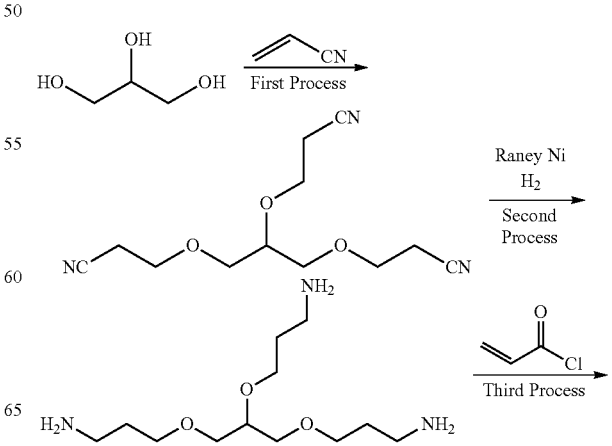

-continued

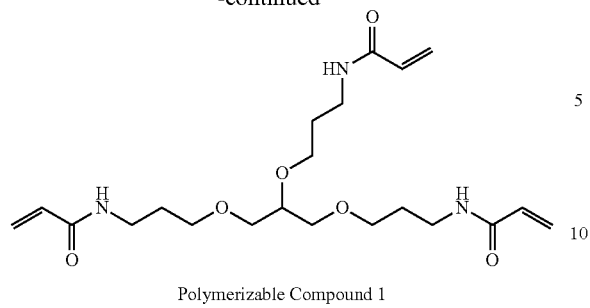

Polymerizable Compound 1

—Synthesis of Polymerizable Compound 2—

Polymerizable compound 2 (white solid) was synthesized in the same manner as in the synthesis of polymerizable compound 1, except that erythritol (9.9 g) was added instead of glycerin in the first process. The yield through the three processes was 53%.

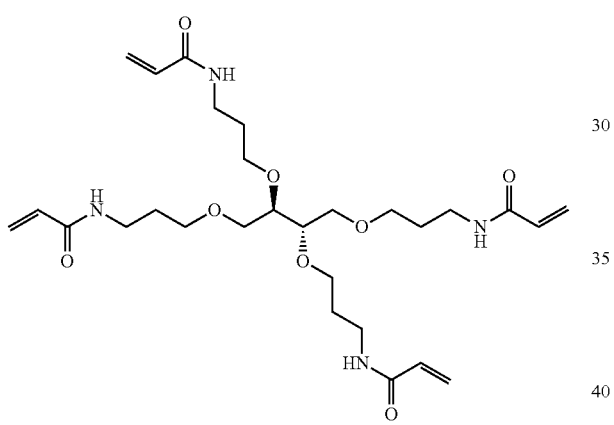

Polymerizable compound 2

—Synthesis of Polymerizable Compound 3—

Polymerizable compound 3 (colorless liquid) was synthesized in the same manner as in the synthesis of polymerizable compound 1, except that xylitol (9.9 g) was added instead of glycerin in the first process. The yield through the three processes was 24%.

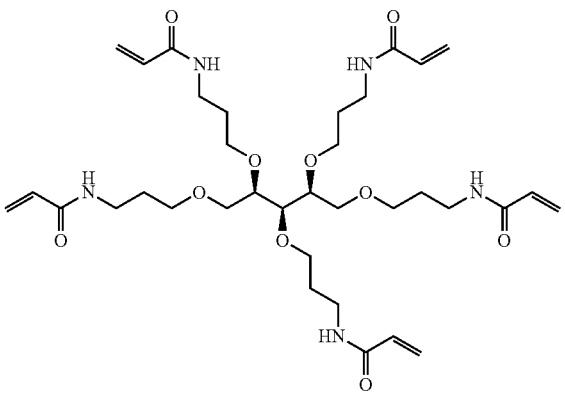

Polymerizable compound 3

—Synthesis of Polymerizable Compound 4—

Polymerizable compound 4 (colorless liquid) was synthesized in the same manner as in the synthesis of polymerizable compound 1, except that D-mannitol (9.9 g) was added instead of glycerin in the first process. The yield through the three processes was 15%.

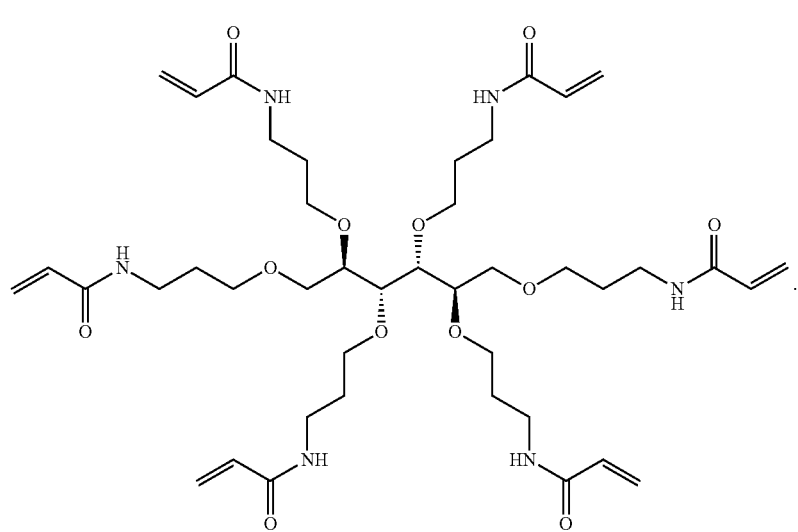

Polymerizable compound 4

—Synthesis of Polymerizable Compound 6—

Polymerizable compound 6 (white solid) was synthesized in the same manner as in the synthesis of polymerizable compound 1, except that pentaerythritol (11.1 g) was added instead of glycerin in the first process. The yield through the three processes was 45%.

Polymerizable compound 6

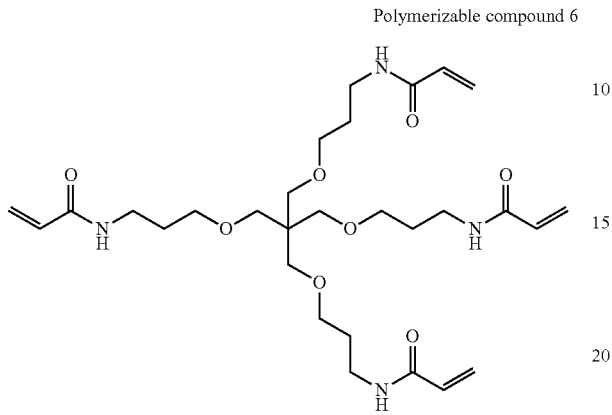

—Synthesis of Polymerizable Compound 7—

Polymerizable compound 7 (colorless liquid) was synthesized in the same manner as in the synthesis of polymerizable compound 1, except that dipentaerythritol (13.8 g) was added instead of glycerin in the first process. The yield through the three processes was 19%.

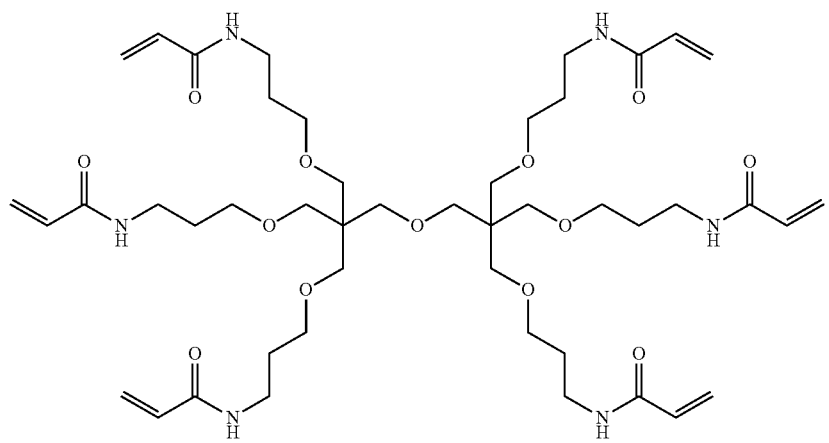

—Synthesis of Comparative Polymerizable Compound 1—

Comparative polymerizable compound 1 (following structure) was synthesized by combining known synthesis methods, with reference to JP-A No. 2005-314610.

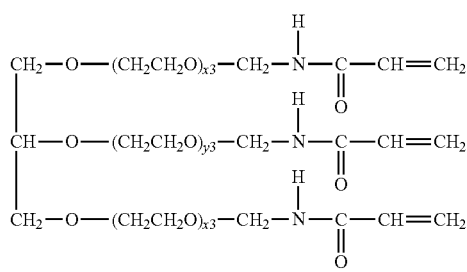

$x3 + y3 + z3 = 6$

—Synthesis Of Comparative Polymerizable Compound 2—

Comparative polymerizable compound 2 (following structure) was synthesized by combining known synthesis methods, with reference to JP-A No. 2005-314610.

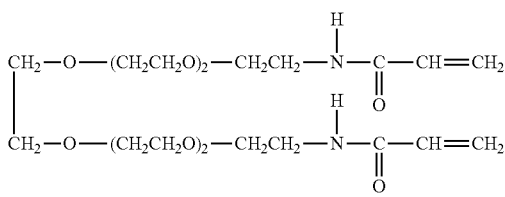

Example 1

Preparation of Cyan Ink (C-1)

The polyfunctional polymerizable compound, a monofunctional polymerizable compound, a photopolymerization initiator, the resin-coated cyan pigment dispersion, a surfactant and ion exchanged water were mixed to provide the following ink formulation, and the mixture was filtrated with a 5-1 μm membrane filter, as a result of which cyan ink (C-1) was prepared.

Polymerizable Compound 7

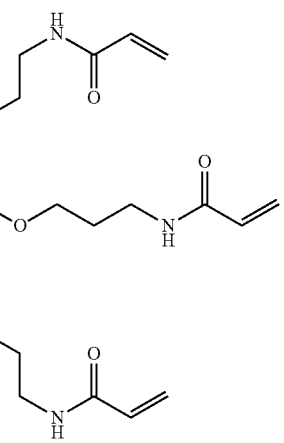

—Ink Formulation—

| | |
|---|---|
| Component A: polymerizable compound 1 | 10% |
| Component B: hydroxyethyl acrylamide (manufactured by Kohjin Co. Ltd.) | 10% |
| Component C: IRGACURE 2959 (trade name, manufactured by BASF Japan Ltd.) | 3% |
| Component D: resin-coated cyan pigment dispersion | 6% |
| OLFINE E1010 (trade name, manufactured by Nisshin Chemical Co., Ltd.) | 1% |
| Component E: ion exchanged water | added to adjust the total to 100% |

The pH (25° C.) of cyan ink (C-1) was measured with a pH meter (WM-50EG, trade name, manufactured by DKK-Toa Corporation), and was found to be 8.5.

Example 2

Preparation of Yellow Ink (Y-1)

Yellow ink (Y-1) was prepared in the same manner as in the preparation of cyan ink (C-1), except that the resin-coated cyan pigment dispersion was replaced by the resin-coated yellow pigment dispersion. The pH of yellow ink (Y-1) was measured in the same manner as above, and was found to be 8.5.

Example 3

Preparation of Magenta Ink (M-1)

Magenta ink (M-1) was prepared in the same manner as in the preparation of cyan ink (C-1), except that the resin-coated cyan pigment dispersion was replaced by the resin-coated magenta pigment dispersion. The pH of magenta ink (M-1) was measured in the same manner as above, and was found to be 8.5.

Example 4

Preparation of Black Ink (K-1)

Black ink (K-1) was prepared in the same manner as in the preparation of cyan ink (C-1), except that the resin-coated cyan pigment dispersion was replaced by a carbon black dispersion (CAB-O-JET™ 200, trade name, manufactured by Cabot Corporation). The pH of black ink (K-1) was measured in the same manner as above, and was found to be 8.5.

Examples 5 to 15

Ink compositions (C-2) to (C-12) of Examples 5 to 15 were prepared in the same manner as in Example 1, except that the types and the addition amounts of Component A and Component B were changed as shown in Table 1.

Comparative Examples 1 to 3

Ink compositions (RC-1) to (RC-3) of Comparative Examples 1 to 3 were prepared in the same manner as in Example 1, except that comparative polymerizable compound 1 or comparative polymerizable compound 2 was used instead of polymerizable compound 1, and that the type and the addition amount of Component B were changed as shown in Table 1.

[Evaluation]

Each of the ink compositions obtained above was evaluated in the following manner with respect to the temporal stability, curability and ejection recoverability of the ink composition, and the flexibility of an image formed using the ink composition. The results are shown in Table 1.

[Evaluation of Temporal Stability of Ink]

The ink composition obtained above was placed in a sample bottle, and the sample bottle was tightly sealed. Thereafter, the sample bottle was stored in a thermostat chamber at 60° C. for two weeks. Two weeks later, the sample bottle was taken out from the thermostat chamber, and the content of acrylamide in the ink composition was quantified by high-performance liquid chromatography (HPLC).

—Evaluation Criteria—

A: the content of acrylamide was equal to or lower than the detection limit (lower than 10 ppm).

B: the content of acrylamide was from 10 ppm to less than 500 ppm.

C: the content of acrylamide was 500 ppm or more.

[Evaluation of Curability]

A printer head (GELJET GX5000, trade name, manufactured by Ricoh Company, Ltd.) was fixed to an inkjet apparatus such that the direction of the line head in which 96 nozzles were aligned (main scanning direction) was orthogonal to the movement direction of the stage (sub scanning direction). The reservoir tank connected to the printer head was filled with the ink composition prepared in any one of Examples 1 to 15 and Comparative Example 1 to 3.

A vinyl chloride film (P280 RW, trade name, manufactured by Lintec Corporation) was prepared as a recording medium, and was attached to the stage that was movable in a direction (sub scanning direction) orthogonal to a direction in which the nozzles of the head were arranged (main scanning direction).

While the stage was moved at a velocity of 211 mm/sec in the conveyance direction (sub scanning direction), 96 lines parallel to the conveyance direction were printed (ink droplet amount=3.4 pL, ejection frequency=10 kHz, nozzle arrangement direction×delivery direction=75×1200 dpi, 2000 ejections per nozzle). It was confirmed that the ink was ejected from all nozzles during the printing.

After the printing, the image was irradiated using a deep UV lamp (SP-7, trade name, manufactured by Ushio Inc.) at 600 mJ/cm$^2$, as a result of which an evaluation sample on which a solid image was formed was obtained.

Unprinted paper (TOKUBISHI ART RYOMEN N, trade name, manufactured by Mitsubishi Paper Mills Limited) was wound around a paper weight (weight: 470 g, size: 15 mm×30 mm×120 mm) such that the area of contact between the unprinted paper and the evaluation sample was 150 mm$^2$, and the printed surface of the evaluation sample, on which the solid image was formed, was rubbed with the paper weight (equivalent to a load of 260 kg/m$^2$) for three reciprocal strokes. The printed surface after being rubbed was visually observed, and evaluated according to the following evaluation criteria.

—Evaluation Criteria—

A: No peeling of the image (colorant) was observed on the printed surface.

B: A slight degree of peeling of the image (colorant) was observed on the printed surface.

C: A practically unacceptable degree of peeling of the image (colorant) was observed on the printed surface.

[Evaluation of Ejection Recoverability]

An image was formed in the same manner as in the image forming method employed for the evaluation of curability. After the ink was ejected, the head was left to stand as it was for varied lengths of time ranging from 5 to 45 minutes at an increment of 5 minutes, a new sheet of the recording medium was attached to the stage, and lines were printed by ejecting the ink under the same conditions as above. The longest length of time for leaving the head to stand, after which all of the 96 nozzles could eject the ink for 2000 ejections, was measured, and the ejection recoverability was evaluated according to the following evaluation criteria. If the longest time for leaving the head to stand is longer, it is indicated that ejection recoverability is more favorable.

—Evaluation Criteria—

A: All nozzles could eject the ink after the head was left to stand for 45 minutes.

B: Some nozzles could not eject the ink after the head was left to stand for a period of time in the range of from 30 minutes to less than 45 minutes.

C: Some nozzles could not eject the ink after the head was left to stand for a period of time in the range of from 20 minutes to less than 30 minutes.

D: Some nozzles could not eject the ink after the head was left to stand for less than 20 minutes.

[Evaluation of Flexibility]

The evaluation sample with a solid image obtained above was folded once in a direction to bring a region of the printed face into contact with another region of the printed face, and was then folded once in a direction to bring a region of the unprinted face into contact with another region of the unprinted face. Thereafter, the printed face was visually observed, and evaluated according to the following evaluation criteria.

—Evaluation Criteria—

A: No cracking or peeling was observed.

B: A slight degree of cracking was observed, but no peeling was observed.

C: Cracking and peeling were observed.

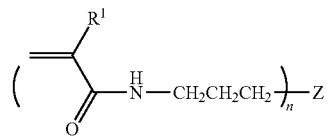

Formula (1)

wherein, in Formula (1), Z represents a polyol residue formed by removing n hydrogen atoms from hydroxyl groups of a trihydric to hexahydric polyol, $R^1$ represents a hydrogen atom or a methyl group, and n represents an integer of from 3 to 6.

2. The ink composition according to claim 1, wherein Z of Formula (1) represents a polyol residue formed by removing n hydrogen atoms from hydroxyl groups of glycerin, erythritol, xylitol, mannitol, sorbitol, pentaerythritol or dipentaerythritol.

3. The ink composition according to claim 1, wherein the monofunctional polymerizable compound having a (meth)acrylamide structure is represented by the following Formula (2):

TABLE 1

| | Ink Composition | Component A Compound | Content | Component B Compound | Content | Component A: Component B | Temporal Stability of Ink | Ejection Recoverability | Curability | Flexibility |
|---|---|---|---|---|---|---|---|---|---|---|
| Example 1 | C-1 | Polymerizable Compound 1 | 10 | Hydroxyethyl acrylamide (Kohjin Co., Ltd.) | 10 | 50:50 | A | B | A | B |
| Example 2 | Y-1 | Polymerizable Compound 1 | 10 | Hydroxyethyl acrylamide | 10 | 50:50 | A | B | A | B |
| Example 3 | M-1 | Polymerizable Compound 1 | 10 | Hydroxyethyl acrylamide | 10 | 50:50 | A | B | B | B |
| Example 4 | K-1 | Polymerizable Compound 1 | 10 | Hydroxyethyl acrylamide | 10 | 50:50 | A | B | B | B |
| Example 5 | C-2 | Polymerizable Compound 1 | 10 | Hydroxyethyl acrylamide | 20 | 33:67 | A | A | A | A |
| Example 6 | C-3 | Polymerizable Compound 1 | 5 | Hydroxyethyl acrylamide | 15 | 25:75 | A | A | A | A |
| Example 7 | C-4 | Polymerizable Compound 1 | 5 | Hydroxyethyl acrylamide | 25 | 17:83 | A | A | B | A |
| Example 8 | C-5 | Polymerizable Compound 1 | 10 | Diacetone acrylamide (Nippon Kasei Chemical Co., Ltd.) | 10 | 50:50 | A | B | B | B |
| Example 9 | C-6 | Polymerizable Compound 1 | 10 | N-(2-dimethylaminoethyl) acrylamide (Kohjin Co., Ltd.) | 10 | 50:50 | A | B | B | B |
| Example 10 | C-7 | Polymerizable Compound 2 | 5 | Hydroxyethyl acrylamide | 15 | 25:75 | A | A | B | A |
| Example 11 | C-8 | Polymerizable Compound 3 | 5 | Hydroxyethyl acrylamide | 15 | 25:75 | A | A | A | A |
| Example 12 | C-9 | Polymerizable Compound 4 | 5 | Hydroxyethyl acrylamide | 15 | 25:75 | A | A | A | B |
| Example 13 | C-10 | Polymerizable Compound 6 | 5 | Hydroxyethyl acrylamide | 15 | 25:75 | A | A | B | A |
| Example 14 | C-11 | Polymerizable Compound 7 | 5 | Hydroxyethyl acrylamide | 15 | 25:75 | A | A | A | B |
| Example 15 | C-12 | Polymerizable Compound 7 | 3 | Hydroxyethyl acrylamide | 27 | 10:90 | A | A | B | A |
| Comparative Example 1 | RC-1 | Comparative Polymerizable Compound 1 | 20 | not added | 0 | 100:0 | C | D | A | C |
| Comparative Example 2 | RC-2 | Comparative Polymerizable Compound 1 | 15 | Acryloyl morpholine (Kohjin Co., Ltd.) | 5 | 75:25 | C | C | B | B |
| Comparative Example 3 | RC-3 | Comparative Polymerizable Compound 2 | 15 | Acryloyl morpholine | 5 | 75:25 | A | C | C | C |

What is claimed is:

1. An ink composition comprising:
   a polymerizable compound represented by the following Formula (1);
   a monofunctional polymerizable compound having a (meth)acrylamide structure;
   a photopolymerization initiator;
   a colorant; and
   water,

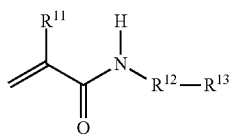

Formula (2)

wherein, in Formula (2), $R^{11}$ represents a hydrogen atom or a methyl group, $R^{12}$ represents an alkylene group, and $R^{13}$ represents an acyl group, a hydroxyl group, a tertiary amino group, a quaternary ammonium group or a sulfo group.

4. The ink composition according to claim 1, wherein a mass ratio of the polymerizable compound represented by Formula (1) and the monofunctional polymerizable compound having a (meth)acrylamide structure (polymerizable compound represented by Formula (1): monofunctional polymerizable compound having a (meth)acrylamide structure) is in a range of from 10:90 to 70:30.

5. The ink composition according to claim 1, wherein a mass ratio of the polymerizable compound represented by Formula (1) and the monofunctional polymerizable compound having a (meth)acrylamide structure (polymerizable compound represented by Formula (1): monofunctional polymerizable compound having a (meth)acrylamide structure) is in a range of from 10:90 to 40:70.

6. The ink composition according to claim 1, wherein an amount of the polymerizable compound represented by Formula (1) is from 1 to 14% by mass relative to a total amount of the ink composition.

7. The ink composition according to claim 1, wherein an amount of the monofunctional polymerizable compound having a (meth)acrylamide structure is from 6 to 35% by mass relative to a total amount of the ink composition.

8. The ink composition according to claim 1, wherein the polymerizable compound represented by Formula (1) is one selected from the group consisting of the following Polymerizable Compounds 1 to 7

Polymerizable Compound 1

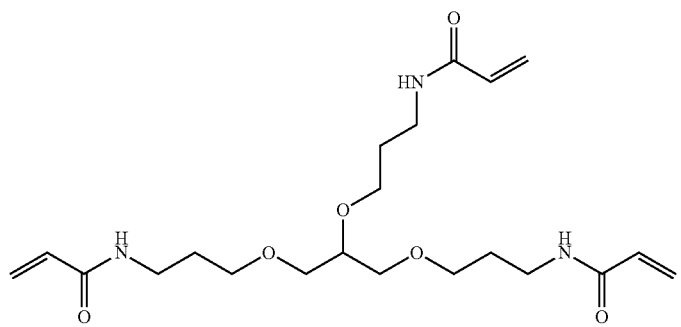

Polymerizable Compound 2

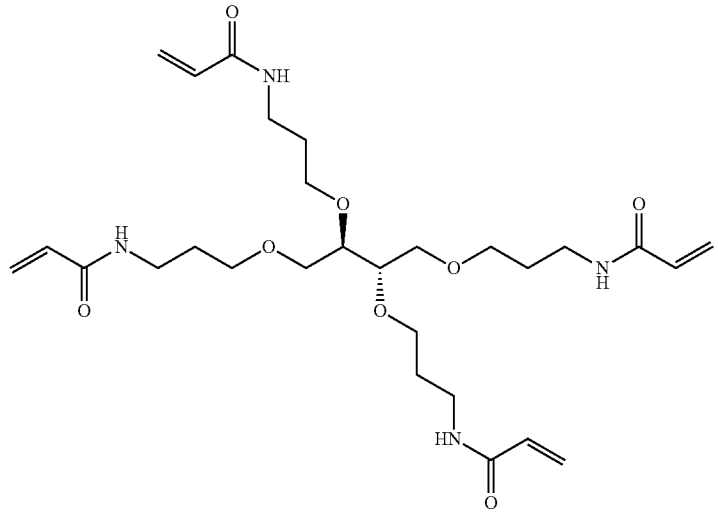

Polymerizable Compound 3
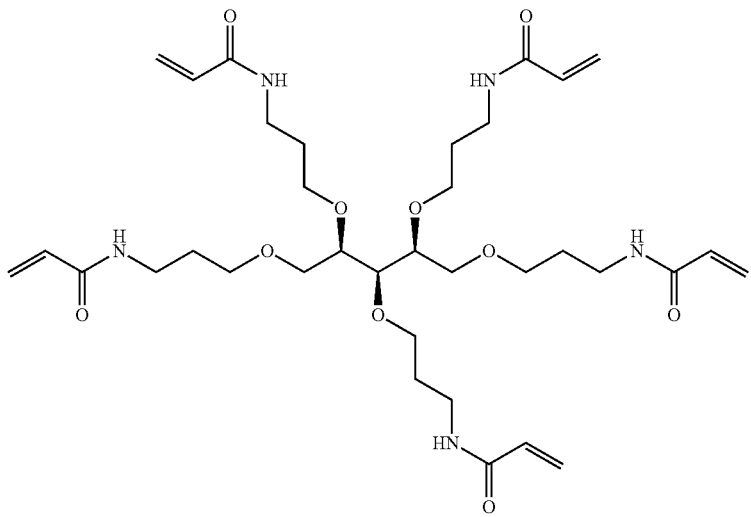
Polymerizable Compound 4
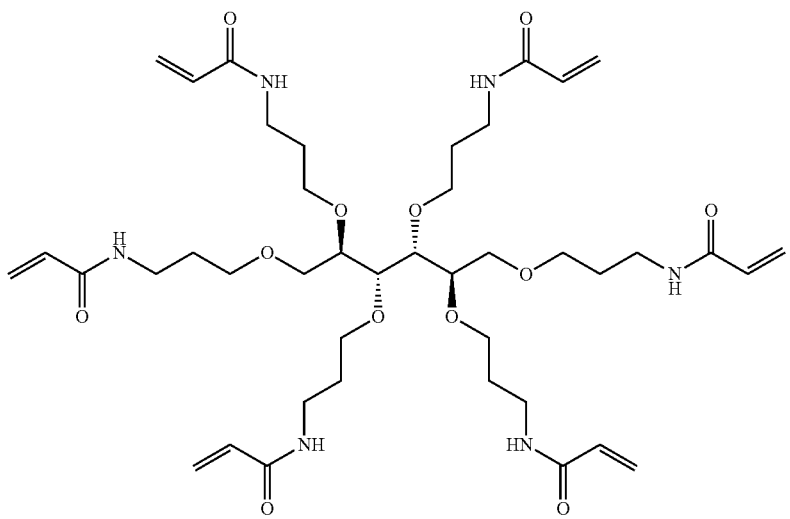
Polymerizable Compound 5
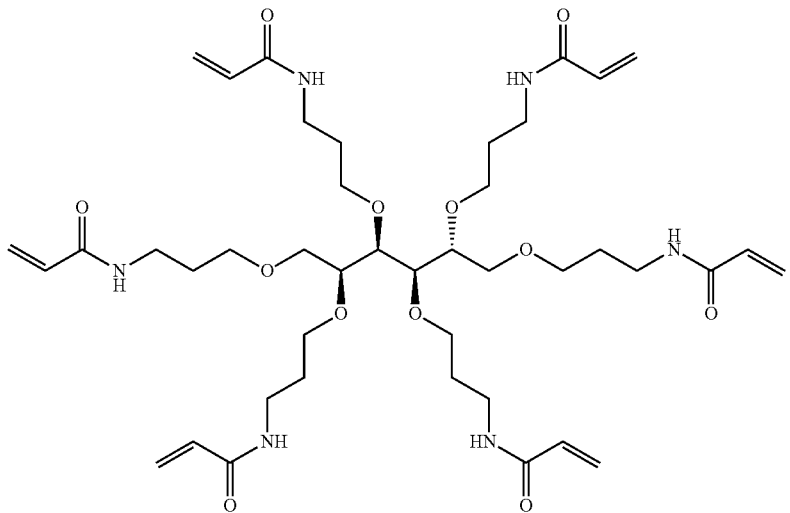

Polymerizable Compound 6
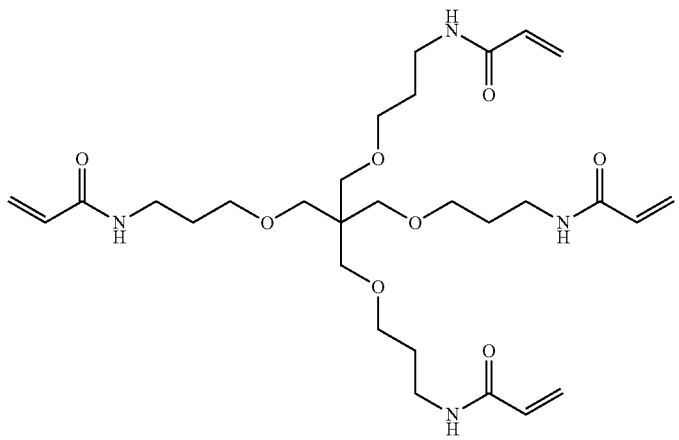
Polymerizable Compound 7
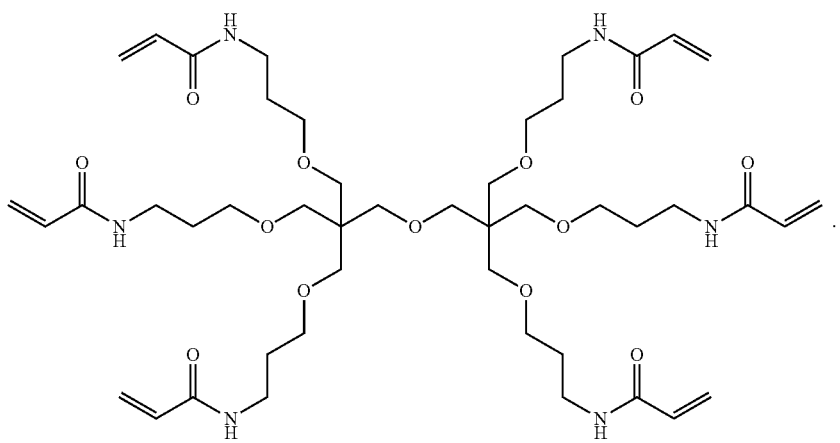
9. The ink composition according to claim 1, wherein the monofunctional polymerizable compound having a (meth)acrylamide structure is one selected from the group consisting of the following compounds (B-1) to (B-10)
(B-1)
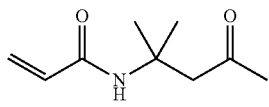
(B-2)
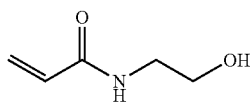
(B-3)
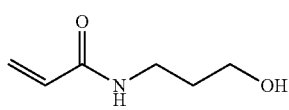
(B-4)
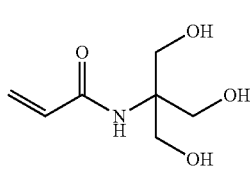
(B-5)
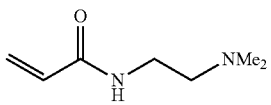
(B-6)
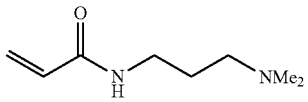
(B-7)
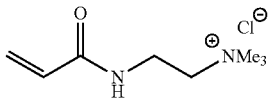
(B-8)
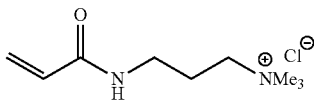
(B-9)
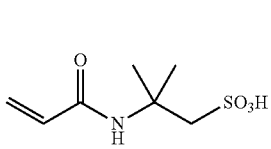

-continued

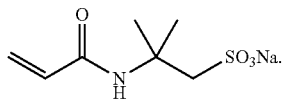

(B-10)

10. The ink composition according to claim 1, wherein the monofunctional polymerizable compound having a (meth)acrylamide structure is hydroxyethyl acrylamide.

11. The ink composition according to claim 1, wherein the photopolymerization initiator is a water-soluble photopolymerization initiator.

12. A method of inkjet recording using the ink composition according to claim 1.

13. An image forming method comprising:
 applying the ink composition according to claim 1 onto a recording medium; and
 irradiating the applied ink composition with actinic energy rays.

14. The image forming method according to claim 13, wherein the applying of the ink composition comprises applying the ink composition by inkjetting.

* * * * *